(12) United States Patent
Gonzalez et al.

(10) Patent No.: US 9,767,326 B2
(45) Date of Patent: Sep. 19, 2017

(54) METHOD, APPARATUS AND SYSTEM FOR CROWD SOURCED COUNTERFEIT DETECTION AND BRAND ASSURANCE

(71) Applicant: HOUND DOG, LLC, Royal Oaks, CA (US)

(72) Inventors: Abel Gonzalez, Salinas, CA (US); Alvaro Gonzalez, Salinas, CA (US); Antonio Sabarez, II, Monterey, CA (US)

(*) Notice: Subject to any disclaimer, the term of this patent is extended or adjusted under 35 U.S.C. 154(b) by 88 days.

(21) Appl. No.: 14/018,089

(22) Filed: Sep. 4, 2013

(65) Prior Publication Data
US 2014/0252080 A1 Sep. 11, 2014

Related U.S. Application Data

(63) Continuation-in-part of application No. 13/933,752, filed on Jul. 2, 2013, and a continuation-in-part of application No. 13/347,702, filed on Jan. 11, 2012.

(51) Int. Cl.
| | |
|---|---|
| *G05B 19/00* | (2006.01) |
| *G06K 5/00* | (2006.01) |
| *G06Q 10/08* | (2012.01) |
| *G06Q 10/10* | (2012.01) |
| *G06Q 30/00* | (2012.01) |
| *G06Q 30/02* | (2012.01) |

(52) U.S. Cl.
CPC .......... *G06K 5/00* (2013.01); *G06Q 10/0833* (2013.01); *G06Q 10/101* (2013.01); *G06Q 30/0185* (2013.01); *G06Q 30/0201* (2013.01)

(58) Field of Classification Search
CPC ........................................................ G06K 5/00
See application file for complete search history.

(56) References Cited

U.S. PATENT DOCUMENTS

| | | | |
|---|---|---|---|
| 2003/0085989 A1* | 5/2003 | Tay ................. | H04N 7/142 348/14.02 |
| 2011/0167010 A1* | 7/2011 | Soppera ............ | G06Q 30/0185 705/318 |
| 2013/0087620 A1* | 4/2013 | Sharma ............. | G06K 19/14 235/472.01 |
| 2013/0173383 A1* | 7/2013 | Sharma ............. | G06Q 30/0201 705/14.47 |

* cited by examiner

*Primary Examiner* — Omeed Alizada
(74) *Attorney, Agent, or Firm* — Patrick Reilly

(57) ABSTRACT

A method, system and device are provided that collect and provide information related to goods at retail sales locations. The goods may be or include consumer products, commodities, equipment, food, food products, agricultural supplies and agricultural products. A good may be associated with an identifier represented by a bar code or a quick response code, or recorded within an RFID chip and/or a radio frequency or photonic communications device. An observer may transmit the perceived or received identifier to a remote database server and optionally receive a credit for the transmission of this information to the database server. The observer may optionally use a cellular telephone or portable communications device to transmit the identifier, digitized photographic data, GPS data, other geolocational data, time-date stamps, textual data, and/or audio data.

9 Claims, 13 Drawing Sheets

TAKING PICTURE OF AN ITEM

USER RECORD

| USER.REC.ID | USER.ID | TEL.ID | DEVICE.ID |
|---|---|---|---|
| MOB.ADDR | CREDIT.1 | CREDIT.HIST | CREDIT.2 |
| EMAIL.ADDR | OBS.MSG.01 | OBS.MSG.02 | OBS.MSG.N |

FIGURE 6A

OBSERVATION MESSAGE RECORD

| OBS.MSG.ID.01 | SERVER.ADDR | MOB.ADDR |
|---|---|---|
| IDFR.RFID | .IMG1 | .IMG2 |
| PH.DATA.1 | PH.DATA.2 | PH.DATA.N |
| GPS.DATA | TDS.DATA | |

FIGURE 6B

ITEM RECORD

| ITEM.REC.ID.01 | ITEM.ID | AREA.DATA | WHOLE.ID | RETAIL.ID |
|---|---|---|---|---|
| IMAGE.DATA | ITEM.TDS | OBS.MSG.01 – OBS.MSG.99 | | |

FIGURE 6C

PURCHASE MESSAGE

| PUR.REC.ID.01 | SERV.ADDR | SENDER.ADDR | ITEM.ID.01 |
|---|---|---|---|
| USER.ID | VENDOR.ID | PUR.TDS | |

FIGURE 6D

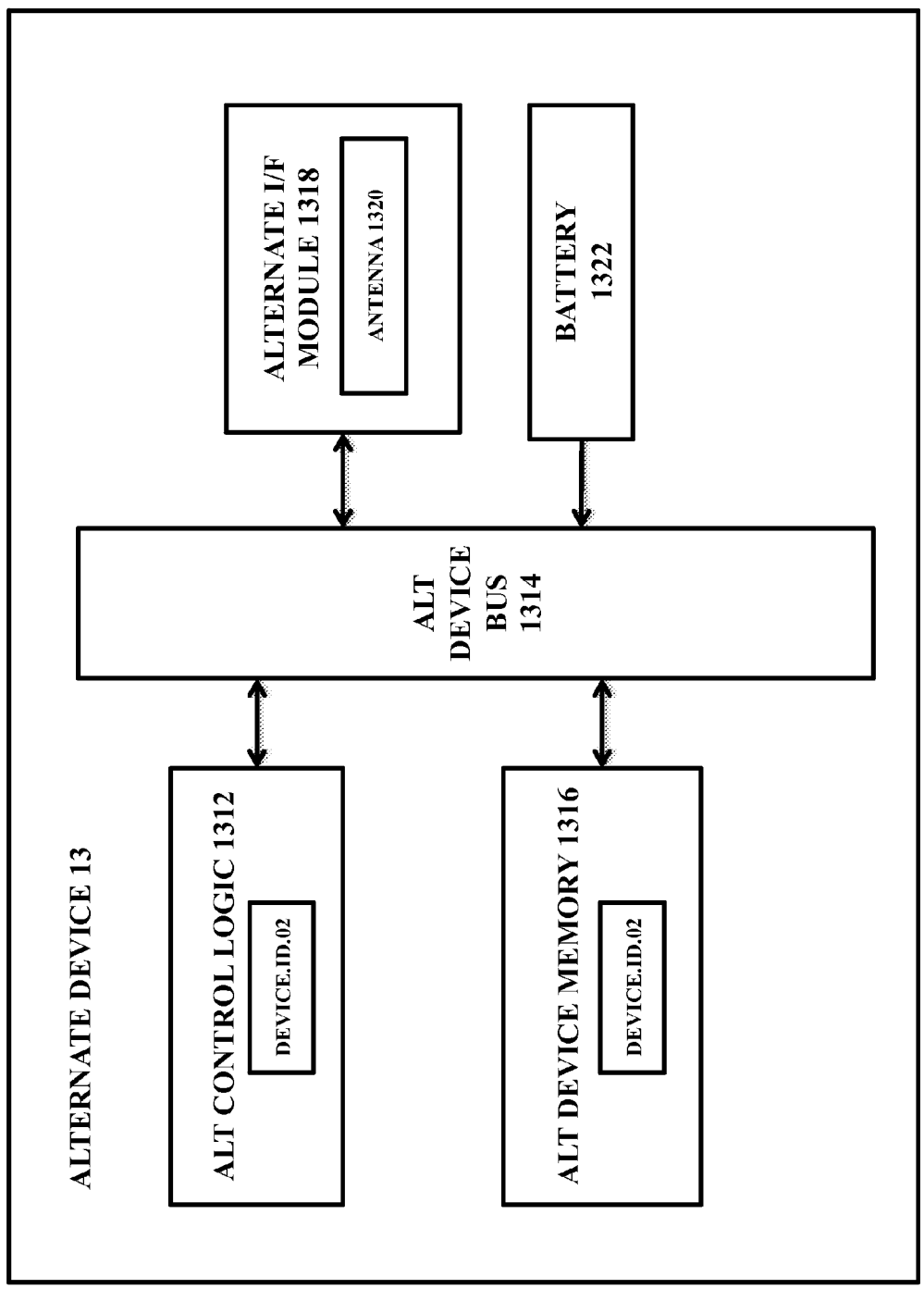

METHOD, APPARATUS AND SYSTEM FOR CROWD SOURCED COUNTERFEIT DETECTION AND BRAND ASSURANCE

CO-PENDING US NONPROVISIONAL PATENT APPLICATION

This Nonprovisional Patent application is a Continuation-in-Part of co-pending U.S. Nonprovisional patent application Ser. No. 13/933,752 titled "METHOD AND SYSTEM FOR TRACKING SHIPPED UNITS DURING MOVEMENT OF GOODS WITHIN SUPPLY CHAIN CHANNELS" as filed on Jul. 2, 2013. U.S. Nonprovisional patent application Ser. No. 13/933,752 is incorporated in its entirety into the present Nonprovisional Patent Application. The present Nonprovisional Patent Application claims date of priority of U.S. Nonprovisional patent application Ser. No. 13/933,752.

BACKGROUND

1. Technical Field

The present invention relates generally to information technology and more particularly to systems and methods for detecting indicators of authenticity and origin of goods.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The counterfeiting of branded and trademarked goods is a serious concern to many manufacturers and resellers of branded and trademarked goods. The financial incentive to intentionally traffic in counterfeit goods generally increases with the degree of regard that the consumer market places on a brand. Premium brands are thus more attractive to counterfeit and are sold at prices that more likely enable the original manufacturer or brand owner to deploy counter measures to counterfeiting.

The prior art includes adding encoded product identifiers to individual items offered for sale. These product identifiers may be visually presented on tags attached to the associated items, and/or in electronic registers, such as radio frequency identification devices. Electronic communications networks, including telephony networks and the Internet, are applied in the prior art to enable parties to compare product identifiers associated with goods-in-hand with registrations of valid product identifiers, The retail sales agent is generally relied upon to confirm that a given item is authentically sourced as indicated by the visually displayed trademarks and brand markings of items in inventory and offered for dale. Yet the retail sales agent is often burdened with many tasks, and runs operations that have slim margins beyond the cost of goods sold. The capacity of a retail sales agent to expend time and resources is assuring that items that appear to be genuine are in fact counterfeit can be reduced by the dynamics of the inventory management. And the motivation of a retail sales agent to determine the authenticity of an item at the moment that a potential purchaser is examining the item or has selected an item for purchase, and thereby potentially lose a clear and present sales opportunity, can be impaired by the fear of losing sales revenue.

The distribution of cellular telephones and network-enabled mobile communications devices has increased tremendously and nearly contemporaneously during both the deployment of radio frequency identification devices in consumer goods and the provision of internet-based access to product identification databases. Many models of smart phones, such as the IPHONE 5™ cellular telephone marketed by Apple, Inc. of Cupertino, Calif., include hardware circuitry and software circuitry that enable the instant consumer communications device to read bar codes and quick response codes. Portable communications devices that read information by means of radio wave communication with radio frequency identification devices are also available in the consumer market, such as the Scanfob™ NFC-BB2 bar code, quick response code and RFID reader device marketed by the Serialio.com company of Cedar Park, Tex.

Yet the prior art fails to optimally encourage consumers themselves to provide purported indicia of authenticity via the Internet or telephony networks for the purpose of detection of counterfeit markings of goods.

There is therefore a long felt need to enable potential purchasers of consumer goods to collect and report information associated with items for sale and to support the detection of false markings of items for sale.

SUMMARY AND OBJECTS OF THE INVENTION

Toward these objects and other objects that are made obvious to one of ordinary skill in the art in light of the present disclosure, a method, system and device are provided that enable crowd sourcing of monitoring of retail outlets for sales of counterfeit goods, improperly marketed goods and inaccurately marked goods. The invented method empowers consumers as agents of brand verification for manufacturers and other stakeholders of brand equity. In an alternate and optional aspect of the invented method, consumers are enabled to the monitor goods placed in the stream of commerce and offered for sale as properly authorized by the original manufacturer or authorized distributor, whereby information regarding the actual pathways of goods within the stream of commerce is harvested and collated.

This Summary is provided to introduce a selection of concepts in a simplified form that are further described below in the Detailed Description. Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In a first aspect of the method of the present invention (hereinafter, "the invented method"), a potential final purchaser of an item examines a marking of the item by means of a portable communications device, such as, but not limited to, a cellular telephone. The examination may include a reading of an item identifier from a visual pattern, such as an alphanumeric serial number display, a bar code or a quick response code, and/or via a receipt by the portable communications device (hereinafter. "client device") of a radio wave transmission from a radio frequency identification device (hereinafter, "RFID"). The client device may then transmit the item identifier to a remotely located database server.

According to a second optional aspect of the invented method, the client device may be empowered to accept or generate textual information, audio data, geolocational information, time-date stamps, digitized photographic image documents, and transmit such additional data to the database server.

According to a third optional aspect of the invented method, a rewards account may be established that may be credited when information regarding (a.) a counterfeit good; (b.) an inaccurately marked good; and/or (c.) an authentically marked good is received by the server and the transmission of the information is associated with the rewards account. The rewards account may be associated with or comprise (a.) a network address of the client device, (b.) a telephone number through which the client device may be accessed; (c.) an email address; (d.) an account number; and/or (e.) a user identifier that is associated with a particular human being.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein:

FIG. 6A is a block diagram of a user record as maintained by the remote server of FIG. 7;

FIG. 6B is a block diagram of an observation message as transmitted from the mobile device of FIG. 1 to the remote server of FIG. 7;

FIG. 6C is a block diagram of an item record as maintained by the remote server of FIG. 7;

FIG. 6D is a block diagram of a purchase message as maintained by the remote server of FIG. 7;

FIG. 8B is a schematic drawing of an exemplary first alternate radio frequency device of FIG. 3;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events, which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
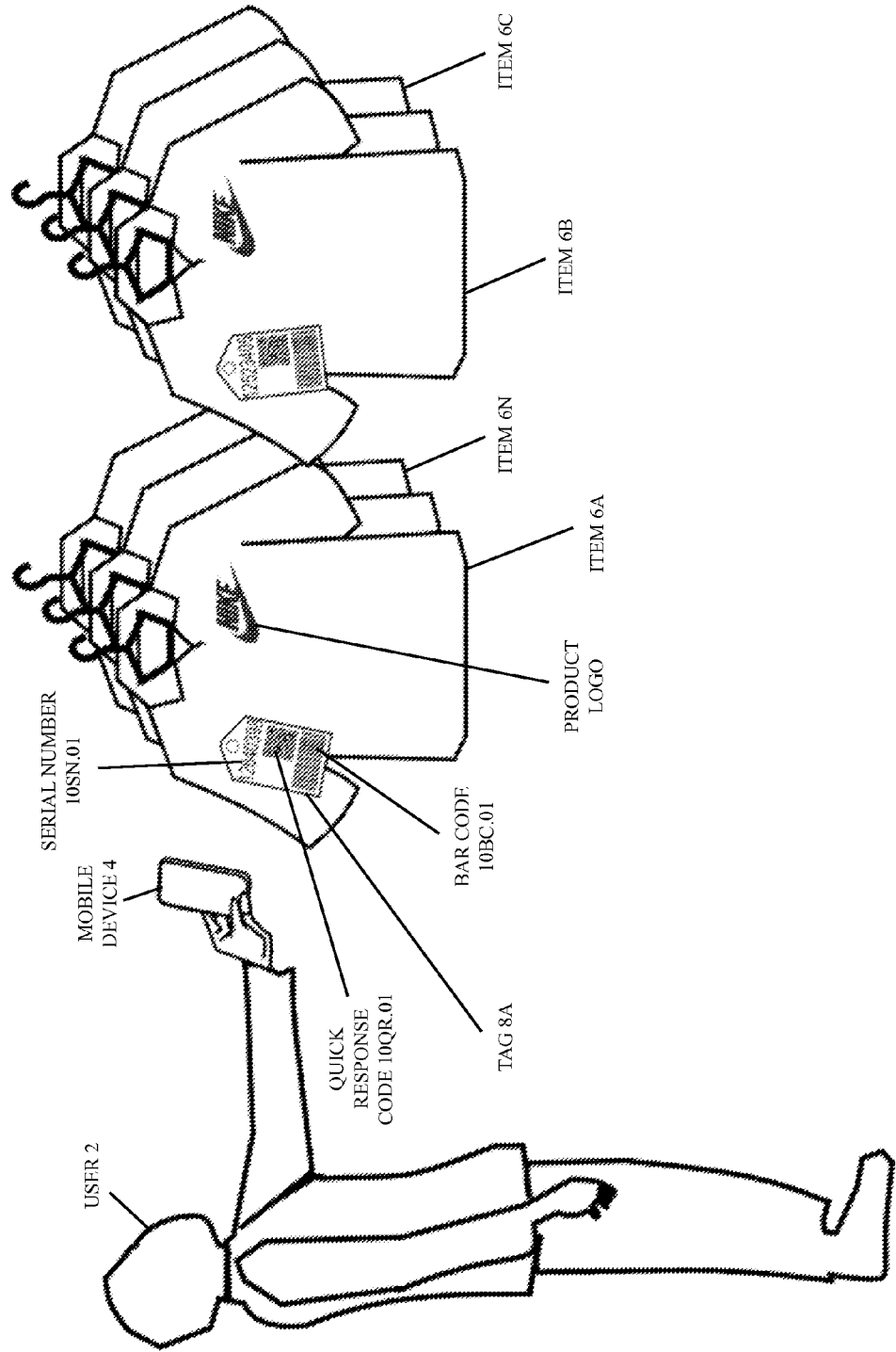
FIG. 1 is a perspective illustration of a user applying the invented method with a mobile electronic communications device to detect encoded item identifiers of individual items.

Referring now generally to the Figures and particularly to FIG. 1, FIG. 1 is a perspective illustration of a user 2 applying a first preferred embodiment of the invented method with a mobile electronic communications device 4 to detect one or more encoded item identifiers ITEM.ID.01-ITEM.ID.N of individual items 6A-6N. A unique tag 8A-8N is preferably attached to one or more items 6A-6N and each unique tag 8A-8N includes a single unique item identifier ITEM.ID.01-ITEM.ID.N associated with a particular item 6A-6N to which the tag 8A-8N is attached. An exemplary first tag 8A is attached to an exemplary first item 6A and optionally visually presents a first item identifier ITEM.ID.01 presented or encoded within one or more images of the first tag 8A such as a first serial number 10SN.01, a first bar code 10BC.01 and/or a first quick response code 10QR.01. One or more items 6A-6N may alternatively or additionally include a product logo 10LG.01-10LG.N that identifies a product type, model type and/or manufacturer. As is further discussed in the present disclosure, one or more items 6A-6N may alternatively or additionally bear or enclose a radio frequency device 11.A-11.N that is adapted and configured to broadcast the single unique item identifier ITEM.ID.01-ITEM.ID.N associated with a particular item 6A-6N to which radio frequency device 11.A-11.N is coupled, wherein the mobile device 4 is enabled to communicate the single unique item identifier ITEM.ID.01-ITEM.ID.N to a remote data base server 12 (hereinafter, "remote server" 12). It is understood that one or all of the radio frequency devices 11.A-11.N may be a radio frequency identification device (hereinafter, "RFID"), while an exemplary alternate device 13 is a battery powered radio frequency device.

The remote server 12 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an IPHONE 5™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable mobile electronic device, wireless communications device, computational system or electronic communications device known in the art.

It is understood that one or more RFID device 11.A-11.N may be or comprise an ALN-9534 2×2 Tag™ RFID device marketed by Alien Technology of Morgan Hill, Calif.; an EPCglobal Compliant Monza™ 4 Chip RFID device marketed by Invengo Technology Corporation of Raleigh, N.C.; Alien Square™ RFID tag device marketed by Alien Technology of Morgan Hill, Calif., or other suitable RFID tag device known in the art. It is further understood that one or more RFID devices may be attached to a tag 8A-8N.

The user 2 applies the mobile electronic communications device 4 (hereinafter, "the mobile device 4") to detect and capture one or more images 10SN.01-10SN.N, 10BC.01-10BC.N, 10QR.01-10QR.N, & 10LG.01-10LG.N. The mobile device 4 is preferably adapted and configured to derive each item identifier ITEM.ID.01-ITEM.ID.N as encoded or presented in one or more images 10SN.01-10SN.N, 10BC.01-10BC.N, 10QR.01-10QR.N, & 10LG.01-10LG.N and further to transmit the derived item identifier ITEM.ID.01-ITEM.ID.N to a remote server 12, as presented in FIGS. 7 and 10. Alternatively or additionally, the mobile device 4 is preferably adapted and configured to generate photographic imaging data PH.DATA.01-PH.DATA.N that when rendered presents one or more images 10SN.01-10SN.N, 10BC.01-10BC.N, 10QR.01-10QR.N, & 10LG.01-10LG.N and transmit the photographic imaging data PH.DATA.01-PH.DATA.N to the remote server 12.

The mobile device 4 preferably weighs less than eight ounces and more preferably weighs less than four ounces, and may be or comprise (a.) an IPHONE 5™ cellular telephone as marketed by Apple, Inc. of Cupertino, Calif.; (b.) an IPAD™ tablet computer as marketed by Apple, Inc. of Cupertino, Calif.; (c.) an HTC TITAN II™ cellular telephone as marketed by AT&T, Inc. of Dallas, Tex. and running a WINDOWS 7™ operating system as marketed by Microsoft Corporation of Redmond, Wash.; (d.) a GALAXY NEXUS™ smart phone as marketed by Samsung Group of Seoul, Republic of Korea or and running an ANDROID™; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable mobile electronic device, wireless communications device, computational system or electronic communications device known in the art.

Figure 2:
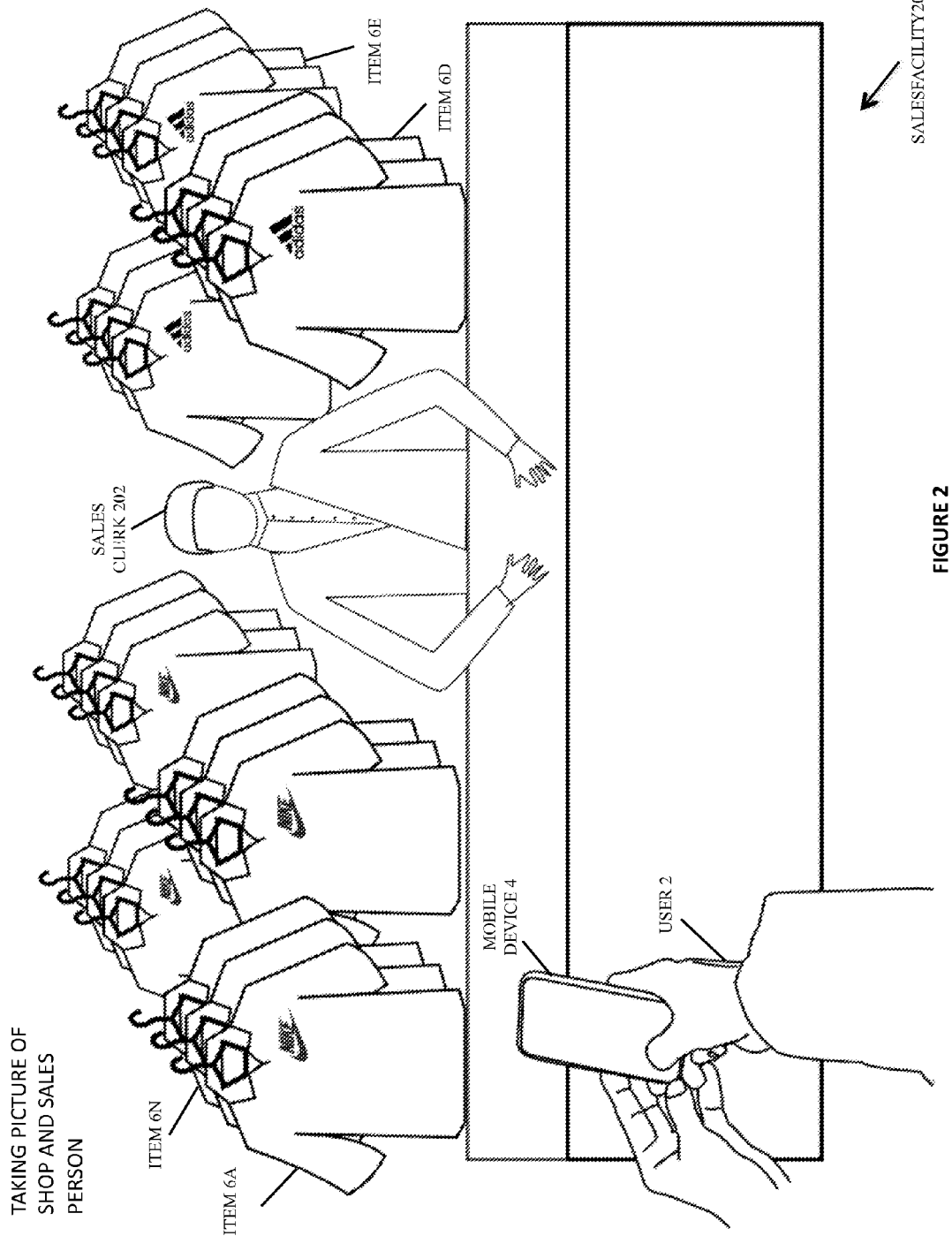
FIG. 2 is a perspective illustration of the user of FIG. 1 attempting to detect item identifiers of individual items positioned within a retail sales location.

Referring now generally to the Figures and particularly to FIG. 2, FIG. 2 is a perspective illustration of the user 2 attempting to detect item identifiers of individual items ITEM.ID.01-ITEM.ID.N positioned within a retail salesfacility200. A sales clerk 202 may be photographed by the user 2 by means of the mobile device 4. The user 2 may additionally or alternatively photograph the retail salesfacility200 and one or more items ITEM.ID.01-ITEM.ID.N. By this optional aspect of the invented method, a user 2 may generate identifying documentation of personnel offering for sale goods that are potentially (a.) counterfeit goods, (b.) gray market goods, and/or (c.) goods unauthorized for sale by an authorizing agent, such as an original manufacturer or an authorized distributor. The capability of this optional aspect of the invented method to enable the crowd sourcing and sighting of, and data collection concerning, goods that are properly or improperly available for purchase from the stream of commerce. This empowerment of consumers as agents of brand verification for manufacturers and other stakeholders of brand equity by the invented method is enabled by the mobile device 4 acting in concert with the remote server 12.

Figure 3:
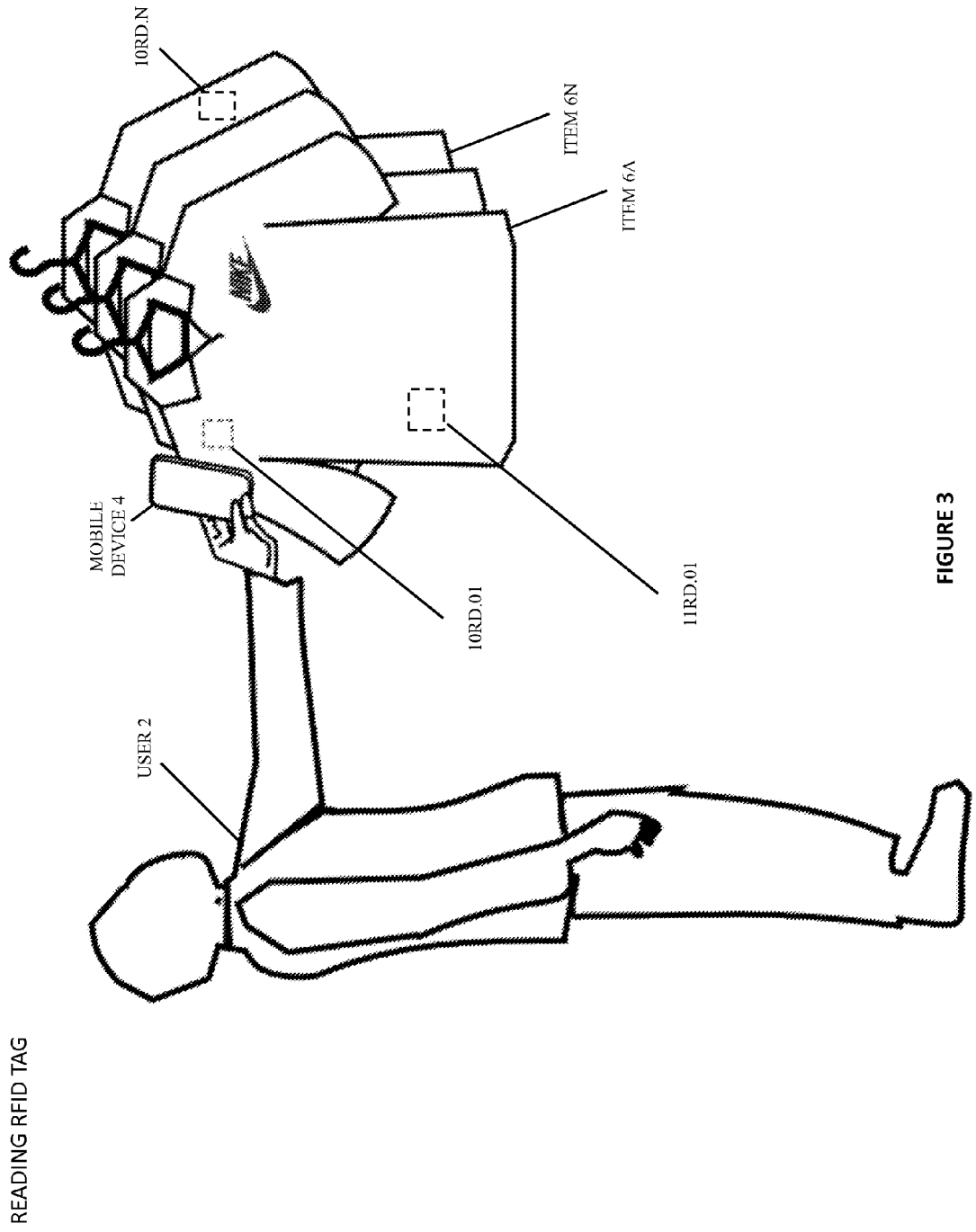
FIG. 3 is a perspective illustration of the user of FIG. 1 applying the mobile electronics device of FIG. 1, or "mobile device", to detect encoded item identifiers of individual items as broadcast from one or more radio frequency devices.

Referring now generally to the Figures and particularly to FIG. 3, FIG. 3 is a perspective illustration of the user 2 applying the mobile device 4 to detect encoded item identifiers ITEM.ID.01-ITEM.ID.N of individual items 6A-6N as broadcast from one or more radio frequency devices 11.A-11.N. It is understood that the mobile device 4 may comprise a combination of (a.) a consumer electronics product comprising a bundled set of hardware modules and software, such as an IPHONE 5™; (b.) one or more peripheral electronic hardware modules that enable the detection of item identifiers ITEM.ID.01-ITEM.ID.N from radio frequency signals; (c.) one or more peripheral electronic hardware modules that enable the detection of item identifiers ITEM.ID.01-ITEM.ID.N from light frequency or photonic pulse signals; and/or (d.) one or more additional software applications that derive item identifiers ITEM.ID.01-ITEM.ID.N by analysis of visual image data, radio frequency data, or light energy data generated by the mobile device 4.

Figure 4:
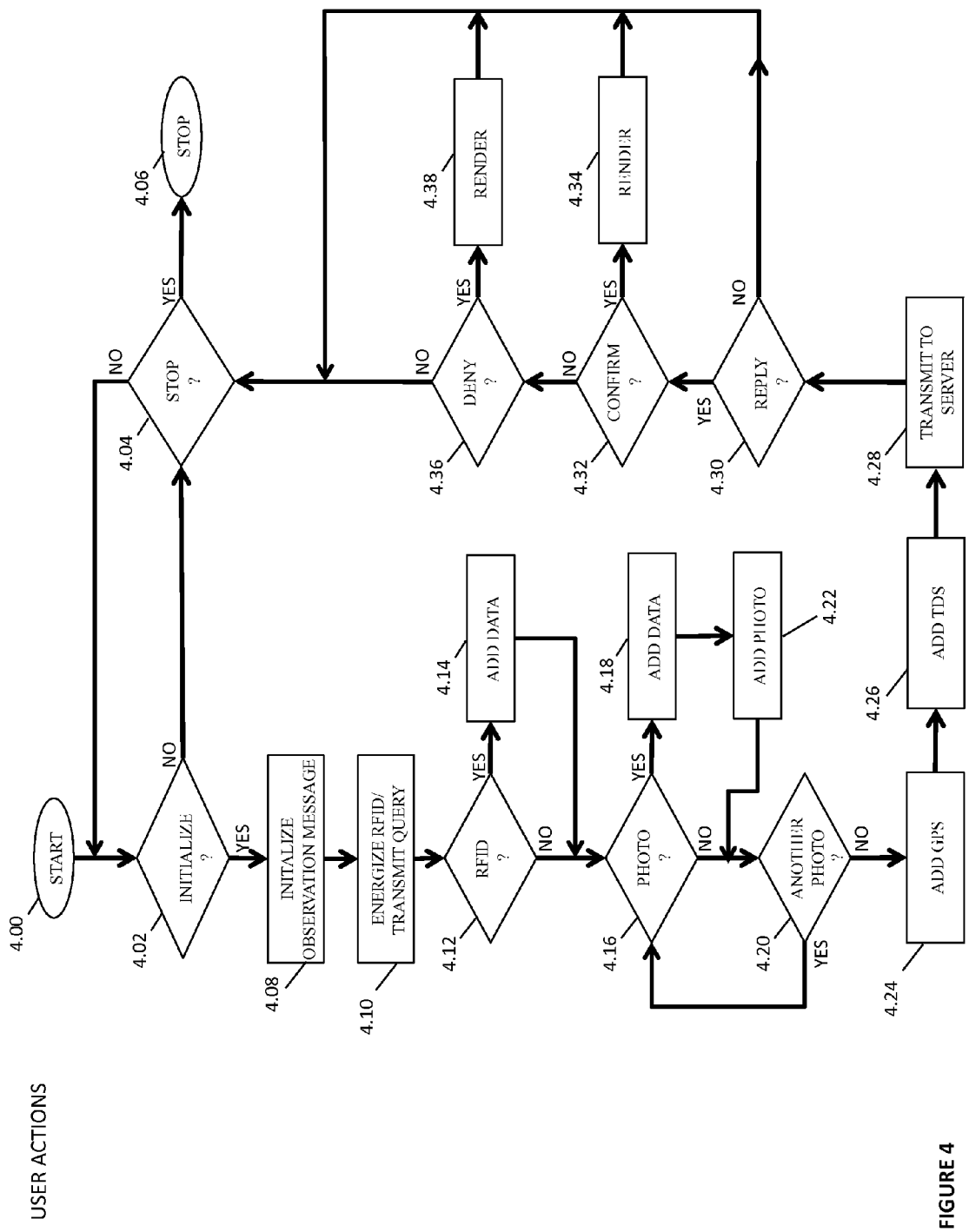
FIG. 4 is a software flowchart of operations of the mobile device of FIG. 1 in applying a first preferred embodiment of the invented method wherein the user of FIG. 1 interacts with a remote server of FIG. 7 in communication of encoded item identifiers.

Referring now generally to the Figures and particularly to FIG. 4, FIG. 4 is a software flowchart of operations of the mobile device 4 in applying the first preferred embodiment of the invented method (hereinafter, "first method") wherein the user 2 interacts with the remote server 12 in communication of encoded item identifiers ITEM.ID.01-ITEM.ID.N as enabled by a mobile device software SW.MOB.01 of the mobile device 4.

The mobile device 4 powers up in step 4.00 and determines in step 4.02 if the user 2 has input a command to generate and transmit an observation message MSG.OBS.01-MSG.OBS.N. When the mobile device 4 does not detect an input command in step 4.02 to generate and transmit an observation message MSG.OBS.01-MSG.OBS.N, the mobile device proceeds from step 4.02 to step 4.04 and determines whether to proceed on to other computational processes of step 4.06 or to proceed back to another execution of step 4.02. It is understood that mobile device 4 may proceed later from step 4.06 to step 4.00 or 4.02 as directed by user input or by the mobile device software SW.MOB.01.

When the mobile device 4 determines in step 4.02 that the user 2 has input a command to generate and transmit an observation message MSG.OBS.01-MSG.OBS.N, the mobile device 4 initializes the new observation message MSG.OBS.01-MSG.OBS.N in step 4.08 wherein a network server address ADDR.SRV of the remote server 12 is entered as the addressee address of the newly initialized observation message MSG.OBS.01-MSG.OBS.N of step 4.08.

The process of FIG. 4 will be discussed as applied to an exemplary first observation message MSG.OBS.01 and it is understood that process of FIG. 4 may be applied to generate and transmit additional observation messages MSG.OBS.02-MSG.OBS.N. It is understood that when the mobile device 4 comprises an RFID receiver module 400, as shown in FIG. 8, the mobile device 4 transmits an RFID energizing pulse in step 4.10. Alternately or additionally, the mobile device 4 may transmit a radio frequency query message in step 4.10. The mobile device 4 then determines in step 4.12 whether a radio frequency transmission has been received and attempts to derive an item identifier ITEM.ID.01-ITEM.ID.N from a detected radio frequency transmission. When the mobile device 4 determines that a possible item identifier ITEM.ID.01-ITEM.ID.N has been received in step 4.12, the mobile device 4 proceeds to step 4.14 to write the derived a possible item identifier ITEM.ID.01-ITEM.ID.N into the exemplary first observation message MSG.OBS.01. The case will now be considered where the first item identifier ITEM.ID.01 is detected in step 4.12 and written into the exemplary first observation message OBS.MSG.01.

The mobile device 4 then determines in step 4.16 whether a digitized photographic document PH.DATA.01-PH.DATA.N has been generated by the mobile device 4 and if the user 2 has input a command directing the mobile device software SW.MOB to attempt to derive an item identifier ITEM.ID.01-ITEM.ID.N from the detected photographic document PH.DATA.01-PH.DATA.N. When the mobile device 4 determines that a possible item identifier ITEM.ID.01-ITEM.ID.N has been derived in step 4.16 from the photographic document PH.DATA.01-PH.DATA.N detected in step 4.16, the mobile device 4 proceeds to step 4.18 to write the derived possible item identifier ITEM.ID.01-ITEM.ID.N into the exemplary first observation message MSG.OBS.01. It is understood that the possible item identifier ITEM.ID.01-ITEM.ID.N derived in step 4. may be read from a serial number 10SN.01-10SN.N, a bar code pattern 10BC.01-10BC.N, and/or a quick response code 10QR.01-10QR.N. It is further understood that different possible item identifiers ITEM.ID.01-ITEM.ID.N may be read from different image data 10SN.01-10SN.N, 10BC.01-10BC.N, & 10QR.01-10QR.N and that two or more different possible item identifiers ITEM.ID.01-ITEM.ID.N may be written into the exemplary first observation message MSG.OBS.01 in step 4.18. As conflicting item identifiers ITEM.ID.01-ITEM.ID.N associated with a same item 6A-6N may indicate product tampering or product counterfeiting, the inclusion of divergent item identifiers ITEM.ID.01-ITEM.ID.N in a same observation message MSG.OBS.01-MSG.OBS.N is preferably enabled by the mobile device software SW.MOB.

Optionally or alternatively, the photographic document PH.DATA.01-PH.DATA.N detected in step 4.16 is written into the exemplary first observation message MSG.OBS.01 in step 4.20, whereby, for example, a digitized image of a first tag 8A, a product logo 10LG.01-10LG.N, an aspect of the retail sales facility 200 and/or the sales clerk 202 may be added into the exemplary first observation message MSG.OBS.01 in step 4.20.

The mobile device 4 determines in step 4.22 whether a user input command has been received that directs the mobile device 4 to perform another execution of the steps 4.16 through 4.22.

The mobile device 4 optionally generates and adds geo-locational data GPS.DATA to exemplary first observation message MSG.OBS.01 in step 4.2 and/or generates and adds time date stamp TDS.DATA to exemplary first observation message MSG.OBS.01 in optional step 4.26.

The exemplary first observation message MSG.OBS.01 is transmitted from the mobile device 4 in step 4.28.

The mobile device 4 determines in step 4.30 whether a reply message MSG.SRV referencing an observation message MSG.OBS.01-MSG.OBS.N sent from the mobile device 4 has been received. When the mobile device 4 determines that no reply message MSG.SRV referencing an observation message MSG.OBS.01-MSG.OBS.N originated by the mobile device 4 has been received, the mobile device 4 proceeds on to step 4.04.

When the mobile device 4 determines in step 4.32 that a reply message MSG.SRV that is received by the mobile device 4 confirms that the first item identifier ITEM.ID.01 is authenticated by the remote server 12, the mobile device 4 proceeds on to render a confirmation message in step 4.34, and proceeds form step 4.34 to step 4.04.

When the mobile device 4 determines in step 4.36 that a reply message MSG.SRV that is received that informs the mobile device 4 that the information received in the first observation message MSG.OBS.01 is not recognized by the remote server 12 as comprising authenticating data, the mobile device 4 proceeds on to render an advisory message in step 4.38, wherein the advisory message cautions the user 2 that the first item 6A associated with the first item tag 8A may be counterfeit or otherwise be improperly on sale at the retail sales facility. The mobile device 4 proceeds form step 4.38 to step 4.04.

Figure 5:
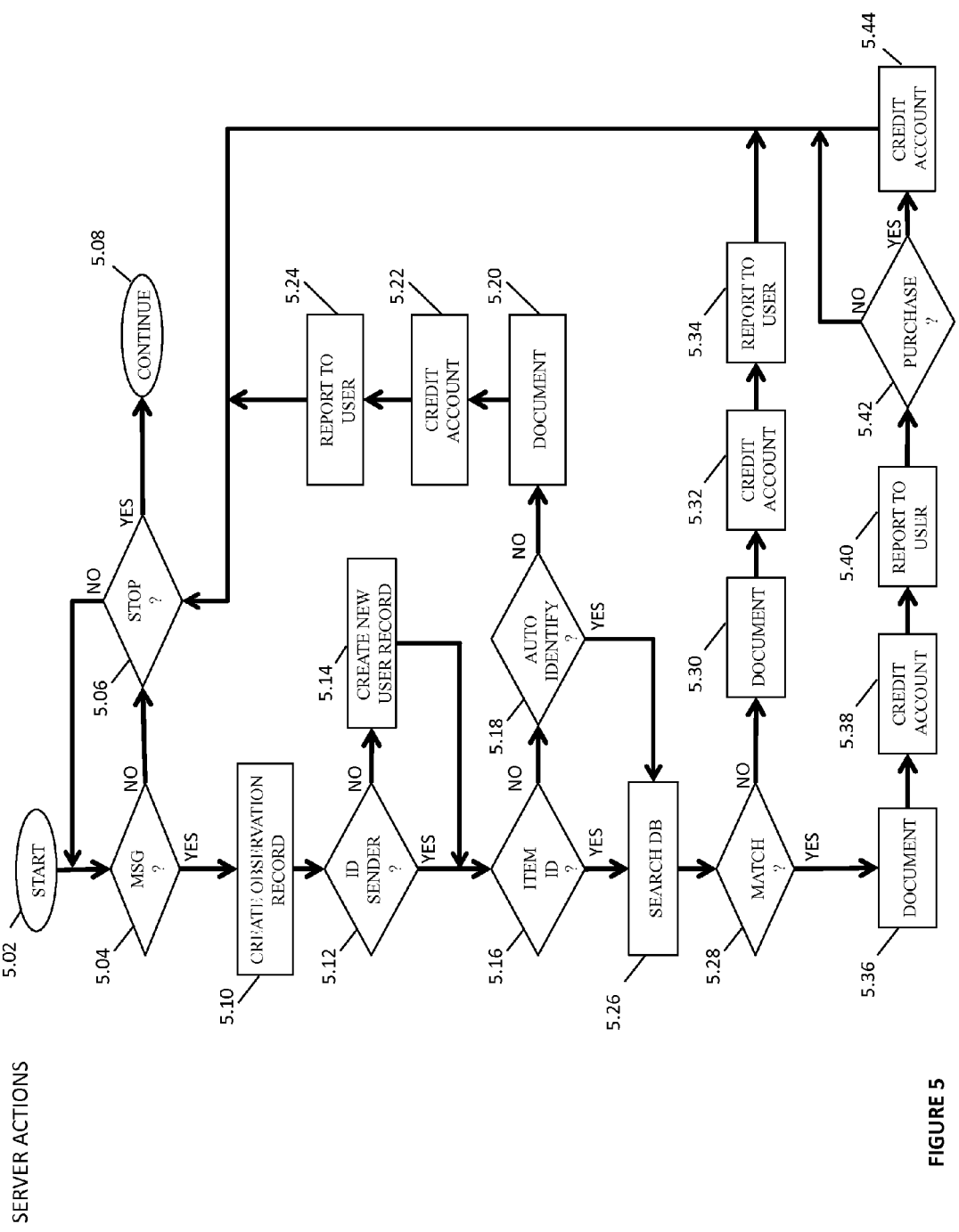
FIG. 5 is a software flowchart of operations of the remote server of FIG. 7 in interaction with the mobile device of FIG. 1 in communication of encoded item identifiers.

Referring now generally to the Figures and particularly to FIG. 5, FIG. 5 is a software flowchart of operations of the remote server 12 in interaction with the mobile device 4 in communication of encoded item identifiers ITEM.ID.01-ITEM.ID.N. The remote server 12 determines in step 5.04 whether an observation message OBS.MSG.01-OBS.MSG.N has been received and if no reception of an observation message OBS.MSG.01-OBS.MSG.N is detected by the remote server 12 in step 5.04 the remote server 12 proceeds onto step 5.06 and to determine whether to (a.) continue monitoring for new receptions of observation messages by additional or continued instantiation of step 5.04, or alternatively (b.) proceed on to other computational operations of step 5.08.

When the remote server 12 determines in step 5.04 that a new observation message OBS.MSG.01-OBS.MSG.N has been received, the remote server 12 proceeds on to step 5.10 and to form a new observation record OBS.REC.01-OBS.REC.N in step 5.10 and writes information extracted from the newly received observation message OBS.MSG.01-OBS.MSG.N into the new observation record OBS.REC.01-OBS.REC.N. In the interest of clarity of explanation, the case where a first exemplary observation message OBS.MSG.01 will be considered in the forgoing discussion of the method of FIG. 5. It is understood that the explanatory references to the first observation message OBS.MSG.01 are relevant to other instances of the remote server processing receipts of alternate observation messages OBS.MSG.02-OBS.MSG.N.

The remote server 12 determines whether the sender identifier of the newly received first observation record OBS.MSG.01 is associated with an existing user identifier USER.ID.01-USER.ID.N of an existing user record USER.REC.01-USER.REC.N. When the remote server 12 does not associate the newly received first observation record OBS.MSG.01 with an existing user record USER.REC.01-USER.REC.N in step 5.12, the remote server 12 generates an exemplary new second user record USER.REC.02 in step 5.14 and writes the first observation message OBS.MSG.01 into the newly detected first observation message OBS.MSG.01 in step 5.04 into the exemplary new second user record USER.REC.02. In the alternative, when the remote server 12 in step 5.12 does associate the newly received first observation record OBS.MSG.01 with an existing user record USER.REC.01-USER.REC.N the remote server 12 writes the first observation record OBS.REC.01 into the associated user record USER.REC.01 or USER.REC.03-USER.REC.N. For example, the first user record USER.REC.01 may be associated with the first observation message by the remote server 12 by a presence of a same first user telephone number USER.TEL, or other information, that is both (a.) stored in the first user record USER.REC.01 and (b.) included in the first observation message OBS.MSG.01, whereupon the remote server 12 will store some or all of the first observation message OBS.MSG.01 in the first user record USER.REC.01, and/or alternately store unique reference to the first observation message OBS.MSG.01 in the first user record USER.REC.01, in step 5.12.

The remote server 12 determines in step 5.16 whether an item identifier ITEM.ID.01-ITEM.ID.N is explicitly detected in the first observation message OBS.MSG.01 or can be identified by image recognition in step 5.18. When the remote server 12 fails to identify an item identifier ITEM.ID.01-ITEM.ID.N the remote server 12 proceeds from step 5.18 to step 5.20 and to document this immediate failure to detect an item identifier ITEM.ID.01-ITEM.ID.N from an analysis of the first observation message ITEM.MSG.01, then optionally credits the user record USER.REC.01 or USER.REC.02 associated with the first observation message OBS.MSG.01 in step 5.22, and in step 5.24 reports the failure to authenticate a valid item identifier ITEM.ID.01-ITEM.ID.N from the information provided in the first observation message ITEM.MSG.01. The remote server 12 proceeds from step 5.24 to step 5.06.

In the alternative, when the remote server 12 successfully detects an item identifier ITEM.ID.01-ITEM.ID.N in either step 5.16 or step 5.18, the remote server 12 proceeds on to step 5.26 and searches an item identifier database ITEM.DB for an association with an existing item record ITEM.REC.01-ITEM.REC.N. The remote server 12 next determines in step 5.28 whether a match of the detected item identifier ITEM.ID.01-ITEM.ID.N with an item record ITEM.REC.01-ITEM.REC.N of the item identifier database ITEM.DB was generated in step 5.26. When the remote server 12 fails to confirm a valid match of the detected item identifier ITEM.ID.01-ITEM.ID.N with an item record ITEM.REC.01-ITEM.REC.N, the remote server 12 proceeds from step 5.28 to step 5.30 and to document this immediate failure to confirm a valid match of the detected item identifier ITEM.ID.01-ITEM.ID.N with an item record ITEM.REC.01-ITEM.REC.N, then optionally credits the user record USER.REC.01 or USER.REC.02 associated with the first observation message OBS.MSG.01 in step 3.32 for submitting the first observation report OBS.MSG.01, and in step 5.34 reports the immediate failure to confirm a valid match of the detected item identifier ITEM.ID.01-ITEM.ID.N with an item record ITEM.REC.01-ITEM.REC.N to the sender address .xx of the first observation message OBS.MSG.01. The remote server 12 proceeds from step 5.34 to step 5.06.

When the remote server 12 determines a valid match of the detected item identifier ITEM.ID.01-ITEM.ID.N with an item record ITEM.REC.01-ITEM.REC.N, the remote server 12 proceeds from step 5.28 to step 5.36 and to document this immediate finding if a valid match of the detected item identifier ITEM.ID.01-ITEM.ID.N with an item record ITEM.REC.01-ITEM.REC.N, then optionally credits the user record USER.REC.01 or USER.REC.02 associated with the first observation message OBS.MSG.01 in step 5.38 for submitting the first observation report OBS.MSG.01, and in step 5.40 reports the immediate confirmation of a valid match of the detected item identifier ITEM.ID.01-ITEM.ID.N with an item record ITEM.REC.01-ITEM.REC.N to the sender address .xx of the first observation message OBS.MSG.01.

The remote server 12 determines in step 5.42 whether a purchase message PUR.MSG.01-PUR.MSG.N has been received that indicates that the user 2 associated with the first observation message OBS.MSG.01 has purchased the first item ITEM.01, and optionally credits the user record USER.REC.01 or USER.REC.02 associated with the first observation message OBS.MSG.01 with a purchase of the first item ITEM.ID in step 5.44. The remote server 12 proceeds to step 5.06 from either step 5.42 to step 5.44.

FIG. 6A is a block diagram of a user record as maintained by the remote server 12. The user record includes a user record identifier USER.REC.ID, a user identifier USER.ID, a telephone number identifier TEL.ID, a device identifier DEVICE.ID, a network address MOB.ADDR, a first user credit CREDIT.1, a user credit history CREDIT.HISTORY, a second user credit CREDIT.2, an email address EMAIL.ADDR, and a plurality of observation messages OBS.MSG.01-OBS.MSG.N. Each observation message OBS.MSG.01-OBS.MSG.N is received from a mobile device 4 and that identifies a user 2.

It is understood that the separate credit values of the two user credits CREDIT.1-CREDIT.2 may be separately and individually incremented or increased by the remote server 12 in steps 5.22, 5.32, 5.38 and/or 5.44. These separate credit values of the two user credits CREDIT.1-CREDIT.2 may have distinguishable options, terms, conditions and permissions for expenditure of earned or allotted user credits by the user 2, such as in the purchase of goods and services from a sole various vendors or service providers. For example, the credit value of the second user credit CREDIT.2 may expire faster than the credit value of the first user credit CREDIT.1 and might be only honored by a particular vendor.

FIG. 6B is a block diagram of the exemplary first observation message OBS.MSG.01 as transmitted from the mobile device 4 to the remote server 12. The exemplary first observation message OBS.MSG.01 is generated by the mobile device 4 and transmitted by the mobile device 4 to the remote server 12. The first observation message OBS.MSG.01 includes an observation message identifier, a server network address SERVER.ADDR of the server 12 as the destination address, a network address MOB.ADDR of the mobile address as the sender address, an exemplary first item identifier ITEM.ID.01, a first digitized photographic image IMG1 of the first exemplary tag 6A, a second digitized photographic image IMG2 of the first exemplary tag 6A, additional digitized photographic data PH.DATA.1-PH.DATA.N, a geolocational data GPS.DATA generated by the mobile device 4 and a time date stamp datum TDS. DATA generated by the mobile device 4. It is understood that the an exemplary first item identifier ITEM.ID.01 may be received by the mobile device by radio wave transmission from the first RFID tag 11.A or the RF device 13, or derived by the mobile device 4 from the images 10SN.01, 10QR.01 & 10BC.01 of the exemplary first tag 8A.

FIG. 6C is a block diagram of an exemplary first item record ITEM.REC.01 as maintained by the remote server 12. The first item record ITEM.REC.01 includes a first item record identifier ITEM.REC.ID.01, the first item identifier ITEM.ID.01, a territory identifier AREA.ID geographic area or territory associated with the first item identifier ITEM.ID.01, a wholesale entity identifier, WHOL.ID, a retail sales identifier RETAIL.ID, a digitized photographic image data IMAGE.DATA of the first item 6A, an item time date stamp ITEM.TDS associated with the first item 6A, and observation messages OBS.MSG.01-OBS.MSG.99 that each cite the same item identifier ITEM.ID.01.

FIG. 6D is a block diagram of an exemplary first purchase message PUR.MSG.01 as maintained by the remote server 12. The first purchase message PUR.MSG.01 is transmitted by a vendor server 600 to the remote server 12 to report a purchase by the user 2 of the first item 6A. The first purchase message PUR.MSG.01 includes a first purchase record identifier PUR.MSG.ID.01, the network server address SERV.ADDR of the remote server 12 as the destination address, a sender address SENDER.ADDR of the vender server 600, the first item identifier ITEM.ID.01, a user identifier USER.ID that is associated with the user 2, a vendor identifier VENDOR.ID of an agent that sold the first item 6A to the user 2, and a purchase time date' stamp PUR.TDS that is associated with the purchase of the first item 6A by the user 2.

Figure 7:
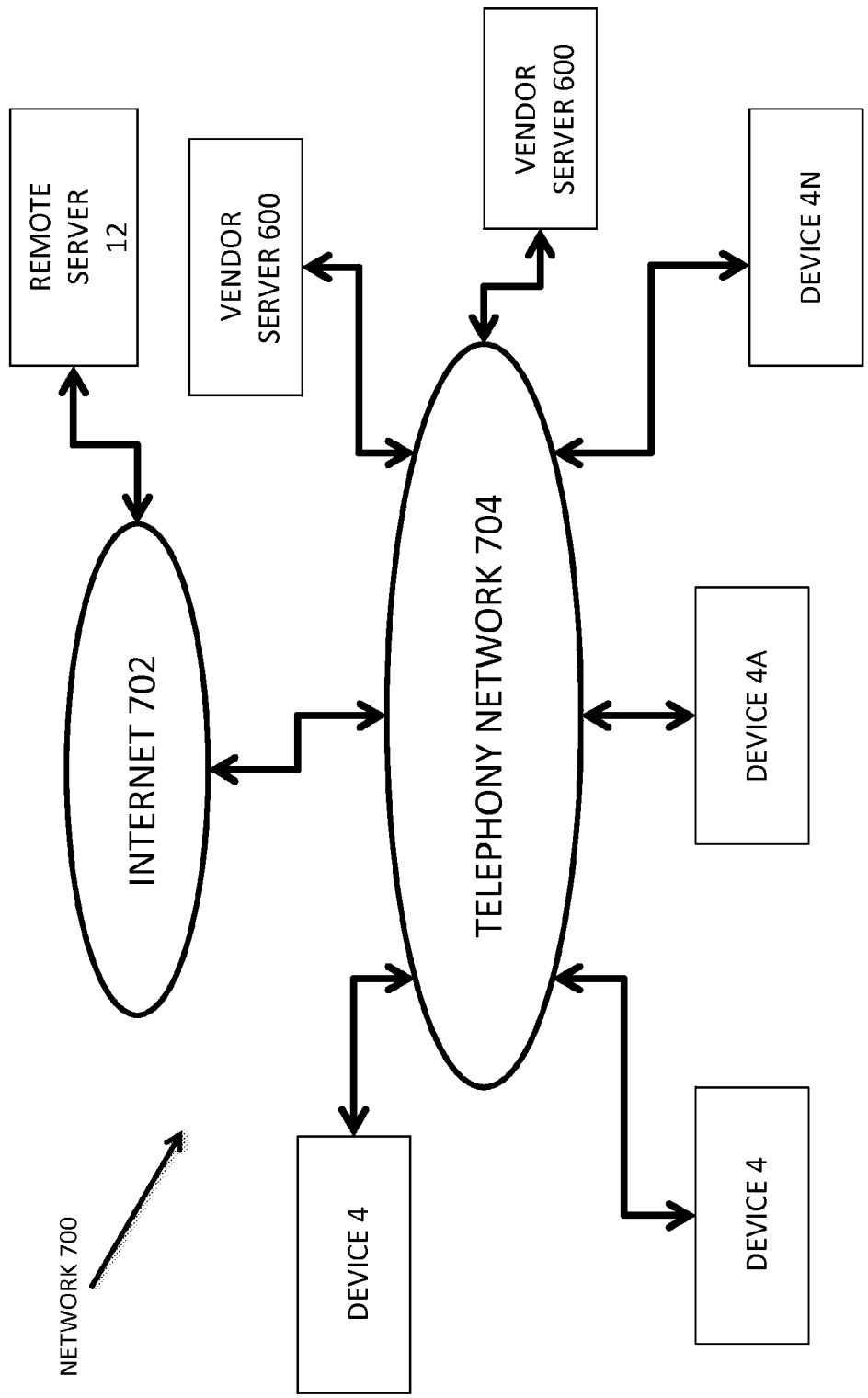
FIG. 7 is a network diagram including an electronics communications network that includes and bi-directionally couples the mobile device of FIG. 1 and the remote server.

Referring now generally to the Figures and particularly to FIG. 7, FIG. 7 is a network diagram including an electronics communications network 700 that includes and bi-directionally couples a plurality of mobile devices 4, & 4A-4N, the vendor server 600 and the remote server 12. It is understood that the electronics communications network 700 (hereinafter, "the network" 700) may include the Internet 702 and a wireless telephony network 704 that are bi-directionally communicatively coupled, wherein the mobile device 4 comprises or is a cellular telephone that communicates with a plurality of wireless communications transponders of the wireless telephony network 704 and the remote server is bi-directionally communicatively coupled with the Internet 702. The remote server 12 and the mobile device 4 may thus bi-directionally communicate via the Internet 702 and the wireless telephony network 704 in combination.

A vendor server 600 is bi-directionally communicatively coupled with the remote server 12 and the Internet 702 and/or the telephony network 704. The vendor server 600 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) an IPHONE 5™ cellular telephone as marketed by Apple, Inc. of Cupertino, Calif.; (g.) an HTC TITAN II™ cellular telephone as marketed by AT&T, Inc. of Dallas, Tex. and running a WINDOWS 7™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.; or (j.) other suitable mobile electronic device, wireless communications device, computational system or electronic communications device known in the art.

Figure 8A:
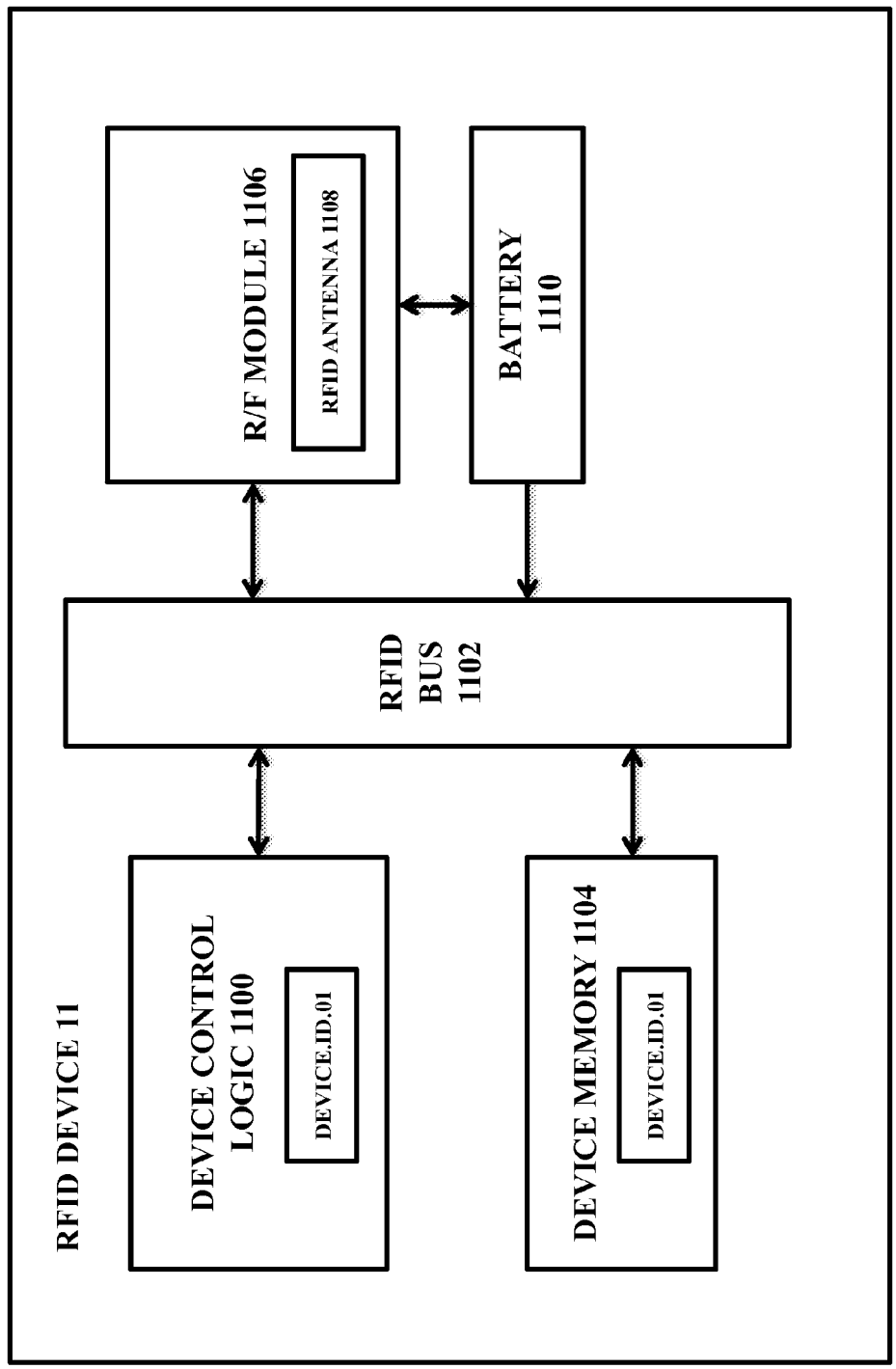
FIG. 8A is a schematic drawing of an exemplary first radio frequency identification device of FIG. 3.

Referring now generally to the Figures and particularly to FIG. 8A, FIG. 8A is a schematic drawing of the exemplary first radio frequency identification device 11.A. The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

The first radio frequency identification device 11.A, or "first RFID device 11.A", includes a device control logic 1100 that is bi-directionally communicatively coupled by an RFID power and communications bus 1102 to a device memory circuit 1104, and a radio frequency communications module 1106. The radio frequency communications module 1106 comprises an antenna 1108 that receives both (a.) electromagnetic wave energy that includes information and (b.) electromagnetic wave energy that provides electrical energy, wherein the antenna 1108 transfers at least a portion of the received electromagnetic wave energy to a battery 1110. The battery 1110 is adapted to provide electrical energy to the device control logic 1100, the device memory circuit 1104 and the radio frequency communications module 1106 via the RFID power and communications bus 1102. The optional capacitor is adapted to store electrical energy and then provide the stored electrical energy directly to the device control logic 1100 and/or the device memory 1104.

The device control logic 1100 may be programmable, configurable, reprogrammable and/or reconfigurable to comprise instructions that enable the first RFID device 11.A to operate in accordance with one, more than one, or all aspects the invented method. A first RFID device identifier DEVICE.ID.01 uniquely identifies the first RFID device 11.A to at least the tag database server 12 and may be stored within the first RFID device 11.A at the device control logic 1100 and/or the device memory 1104. It is further understood that the first RFID device identifier DEVICE.ID.01 may be written into a read only memory, a one time programmable register, and/or a reprogrammable logic element of the device control logic 1100. It is further understood that the device control logic 1100 may be distributed as separate elements that are individually communicatively coupled with the RFID BUS 1102.

It is understood that one, more than one or all aspects or elements 1100-1110 & TR.01-TR.N of the first RFID device 11.A may be comprised within one or more RFID devices 11.A-11.N and/or the exemplary alternate device 13.

Referring now generally to the Figures and particularly to FIG. 8B, FIG. 8B is a schematic drawing of the exemplary first alternate device 13. The first alternate device 13, or "alternate device 13", includes a control logic 1312 that is bi-directionally or uni-directionally communicatively coupled by an alternate power and communications bus 1314 to an alternate device memory circuit 1316 and an alternate interface communications module 1318. The alternate interface communications module 1318 comprises an antenna 1320 that receives and transmits electromagnetic wave energy that includes information.

An alternate battery 1322 is adapted to provide electrical energy to the alternate control logic 1312, the alternate device memory circuit 1316, the alternate interface communications module 1318, the RFID antenna 1320, via the alternate power and communications bus 1314. The alternate control logic 1312 may be programmable, configurable, reprogrammable and/or reconfigurable to comprise instructions that enable the alternate device 13 to operate in accordance with one, more than one, or all aspects the invented method.

A first alternate device identifier DEVICE.ID.02 uniquely identifies the alternate device 13 to at least the remote server 12 and is stored within the alternate device 13 at the alternate control logic 1312 and/or the alternate device memory 1316. It is further understood that the first alternate device identifier DEVICE.ID.02 may be written into a read only memory, a one time programmable register, and/or a reprogrammable logic element of the alternate control logic 1312. It is further understood that the alternate control logic 1312 may be distributed as separate elements that are individually communicatively coupled with the alternate device bus 1314.

It is understood that the numerical designation of "N" in reference to tag indications 4N and 6N indicates the potential of an arbitrarily large multiplicity of individually unique, separate and distinguishable RFID devices 11.A-11.N, wherein the number of RFID devices 11.A-11.N may be limited by resource, design and market-determinate constraints. It is further understood that variations of certain RFID devices 11.A-11.N may comprise any aspect, element or feature 1100-1322 of any tag 11.A-11.N & 13 as disclosed herein.

Figure 9A:
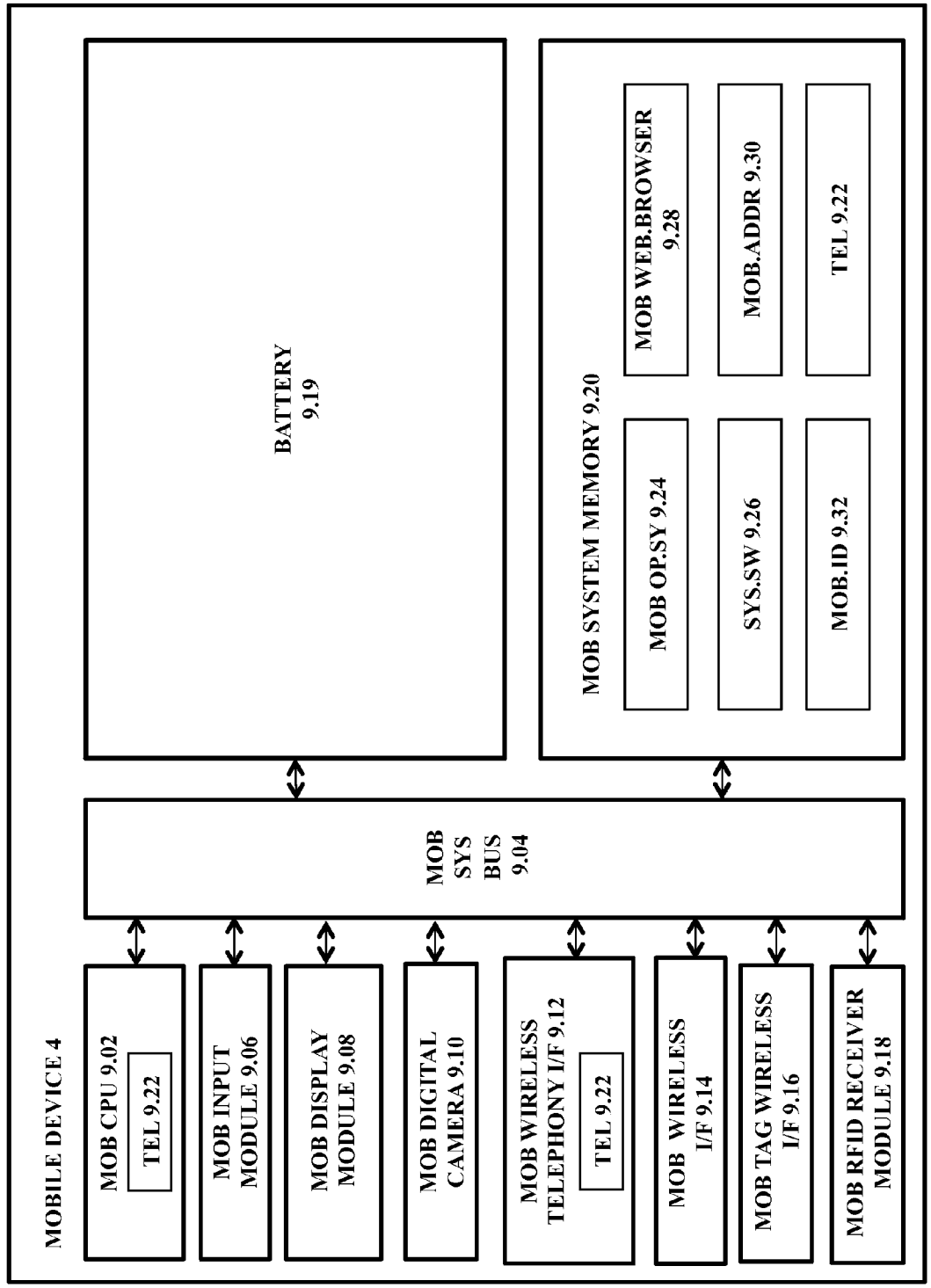
FIG. 9A is a schematic diagram of the mobile device of FIG. 1.

Referring now generally to the Figures and particularly to FIG. 9A, FIG. 9A is a schematic diagram of the mobile device 4. The mobile device 4 includes a mobile device central processing unit 9.02 (hereinafter, "MOB CPU 9.02") that is bi-directionally communicatively coupled by a MOB system power and communications bus 9.04 to a MOB user input module 9.06, a MOB display module 9.08, a MOB digital camera 9.10, a MOB wireless telephony communications interface 9.12, a wireless communications transceiver 9.14, a MOB radio frequency identification device transceiver 9.16, a MOB radio frequency identification receiver module 9.18, a battery 9.19, and a MOB system memory 9.20. The MOB wireless telephony communications interface 9.12 enables the mobile device 4 to bi-directionally communicate via the telephony network 704 and the network 700.

The MOB user input module 9.06 may include a touch screen, a computer keyboard, a computer mouse and/or other human-to-computer input devices that enable the human user 2 to input data, queries and commands to the mobile device 4. The MOB display module 9.08 may comprise a touch screen is adapted to visually render data, images and other representations of other information as output by or by means of the mobile device 4 for perception by the human user 2. The MOB digital camera 9.10 enables the mobile device 4 to capture, digitize and interpret the bar code images 10BC.01-10BC.N, the QR code images 10QR.01-10QR.N and serial numbers 10SN.01-10SN.N from the labels tags 8A-8N in concert with other elements and aspects of the mobile device 4.

The MOB wireless telephony interface 9.12 enables the bi-directional communications between the mobile device 4 and the remote server 12 via the network 700 by reference to a mobile telephone number 9.20. The MOB wireless interface 9.14 enables bi-directional communications between the mobile device 4 and the remote server 12 and the network 700. Additionally or optionally the MOB wireless interface 9.14 may be adapted to enable the mobile device 4 to communicate in accordance with a BLUETOOTH™ communications standard or other suitable wireless communications standards or protocols. The MOB RFID transceiver 9.16 enables the both bi-directional communications between the mobile device 4 and the RFID devices 11.A-11.N and the alternate device 13 and optionally the provision of electrical energy to the RFID devices 11.A-11.N via the RFID antenna 1108.

The MOB system memory 9.20 stores a plurality of software encoded addresses, information, instructions and records, to include the mobile telephony number 9.22, a MOB operating system software 9.24, a MOB system software 9.26, a MOB web browser 9.28, a MOB network address 9.30, and a unique mobile device identifier MOB.ID 9.32. It is understood that the mobile telephony number 9.22 may alternatively or additionally be stored in the MOB CPU 9.02 and/or a MOB wireless telephony communications interface 9.12. The mobile telephony number 9.22 may be or comprise, or be associated with, the telephone number identifier TEL.ID. It is understood that the mobile telephony number 9.22 may be used to request, initiate and/or place a telephone call via the telephony network 704 or network 700 by another telephone (not shown) or a voice-over-internet-protocol communications device (not shown), to include possible use by the remote server 12 in requesting, initiating or placing a voice communications session with the mobile device 4.

The MOB operating system software 9.24 enables the mobile device 4 to perform basic and essential computational tasks, such as scheduling tasks, executing applications, and controlling peripherals. The MOB system software 9.26 provides software-encoded instructions, data and information that enables the mobile device 4 to perform in accordance with the aspects of the method of the present invention including the methods of FIGS. 4 and 5, such as interpreting digital camera signals derived from bar code and QR image detection. The MOB web browser 9.28 enables the mobile device 4 to render received web pages. The MOB network address 9.30 is a unique identifier that may be used to identify the mobile device 4 as a sender or intended recipient of an electronic message.

Figure 9B:
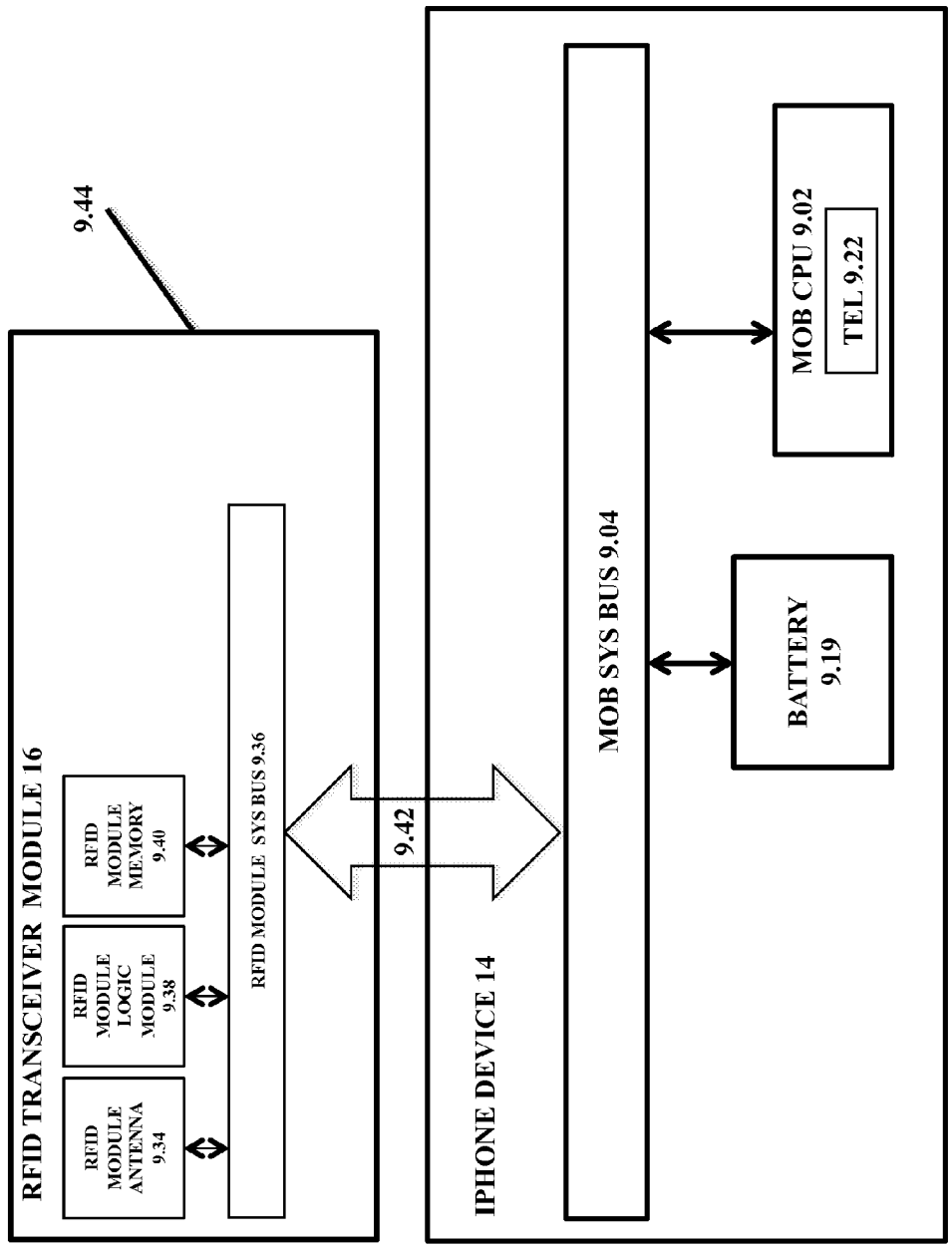
FIG. 9B is a schematic diagram of an alternate embodiment of the mobile device of FIG. 9A and FIG. 1 comprising a cellular telephone and a radio frequency identification transceiver, wherein the radio frequency identification transceiver is adapted for removable coupling with the cellular telephone.

Referring now general to the Figures and particularly to FIG. 9B, FIG. 9B is a schematic diagram of an alternate preferred embodiment of the mobile device 4 that includes an IPHONE 5™ 14 cellular telephone (hereinafter, "iPhone" 14) and an attachable RFID reader transceiver module 16. The radio frequency identification transceiver module 16 includes an RFID module antenna 9.34 that is bi-directionally communicatively coupled by a RFID module power and communications bus 9.36 to an optional RFID module logic circuit 9.38, and an optional RFID module memory 9.40. The RFID reader transceiver module 16 is bi-directionally communicatively coupled to a MOB system communications bus 9.04 of the iPhone 14 by an insertion pin 9.42 whereby (a.) electrical power is delivered from the battery 9.19 to the module RFID reader transceiver module 16, and (b.) item identifiers ITEM.ID.01-ITEM.ID.N received by via the RFID module antenna 9.34 are communicated to the MOB CPU 9.02 of the iPhone 14. The optional RFID module logic circuit 9.38 directs the operation of the RFID module 22 in emitting energizing radio frequency burst transmissions to the RFID devices 11.A-11.N and receiving and deriving item identifiers ITEM.ID.01-ITEM.ID.N from radio energy transmissions emitted by the RFID devices 11.A-11.N.

The RFID transceiver module 16 is preferably enclosed within a protective shell 9.44 that encloses and protects the RFID module antenna 9.34, the RFID module power and communications bus 9.36, the RFID module logic circuit 9.38, and the RFID module memory 9.40.

Figure 10:
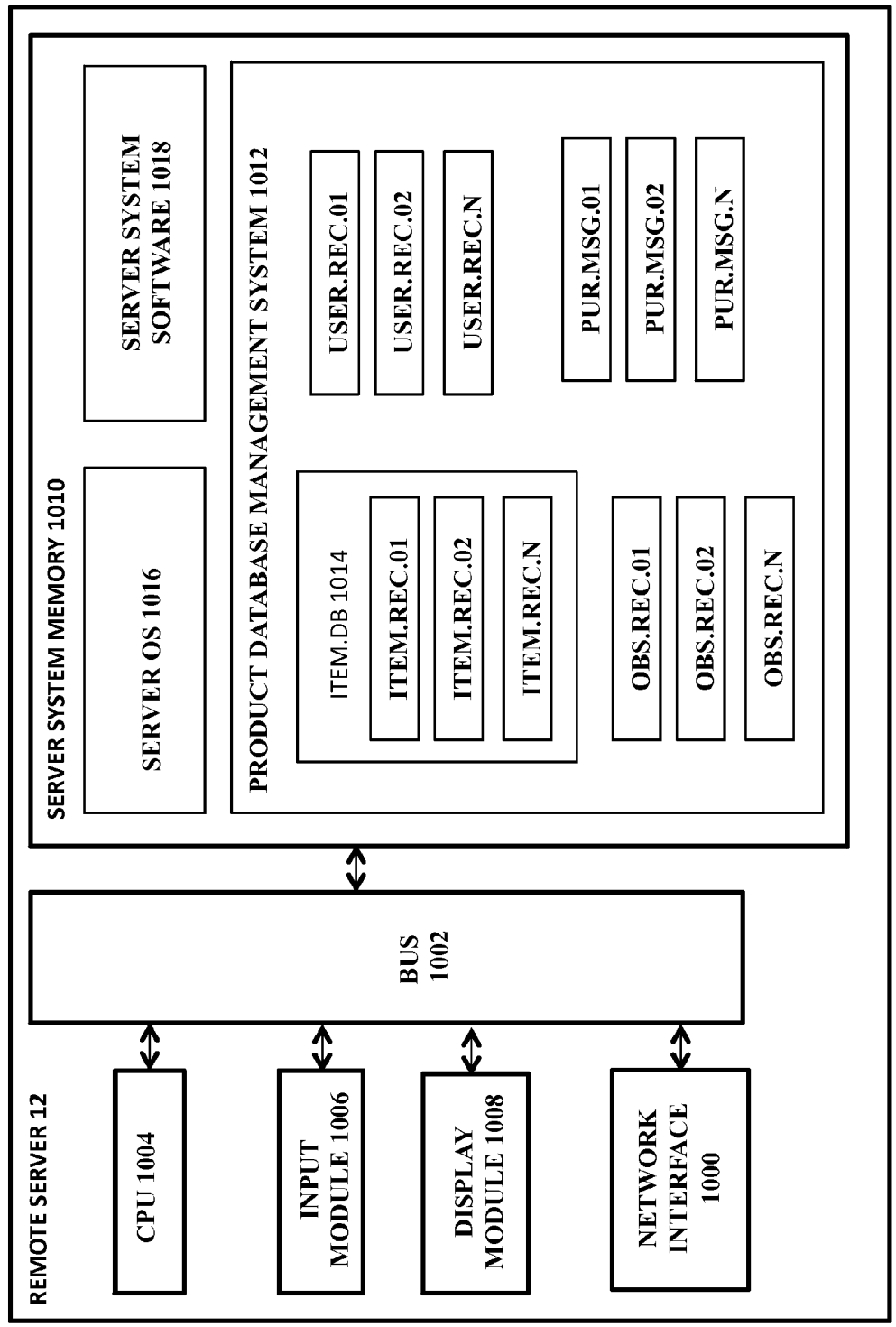
FIG. 10 is a schematic diagram of the remote server of FIG. 7.

Referring now generally to the Figures and particularly to FIG. 10, FIG. 10 is a schematic diagram of the remote server 14. The remote server 12 includes a network interface circuit 1000 that bi-directionally communicatively couples the remote server 12 with the network 700. More particularly, a power and communications bus 1002 bi-directionally communicatively couples the network interface circuit 1000 with a server central processing unit 1004 (hereinafter, "server CPU" 1004), a user input module 1006, a display module 1008 and a server system memory 1010. The server system memory 1010 maintains a product database management system 1012 that stores an item record database 1014, a plurality of observation records OBS.REC.01-OBS.REC.N, a plurality of user account records USER.REC.01-USER.REC.N and a plurality of purchase messages PUR.MSG.01-PUR.MSG.N. The item record database 1014 stores a plurality of item records ITEM.ID.01-ITEM.ID.N.

The server system memory 1010 also stores server system operating system 1016 and a server software1018. The server operating system 1016 enables the remote server 12 to perform basic and essential computational tasks, such as scheduling tasks, executing applications, and controlling peripherals. The server system software 1018 provides software-encoded instructions, data and information that enables the remote server 12 to perform in accordance with the aspects of the method of the present invention including the methods of FIGS. 4 and 5, such as maintaining data base records of the product database management system 1010.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

We claim:

1. A method comprising:
    a. Assigning a product identifier code to a unique product piece;
    b. Writing the product identifier code onto a tag;
    c. Coupling the tag to the unique product piece;
    d. Releasing the unique product piece into a stream of commerce;
    e. Receiving an enquiry message via an electronic communications network, the enquiry message comprising a possible product identifier code and an address identifier of a sending address of the enquiry message;
    f. Quantitatively crediting a credit value user record associated with the address identifier of the sender upon receipt of the enquiry message;
    g. Determining if the possible product identifier code matches the product identifier code;
    h. Sending a positive verification message back to the sending address of the enquiry message when the possible product identifier code matches the product identifier code; and
    i. generating and transmitting a reward message to the sending address of the enquiry message when the determination of a match of the possible product identifier code of the enquiry message with a valid product identifier code is not found, whereby a sender is notified of receiving a credit for finding a possible counterfeit item.

2. The method of claim 1, wherein the enquiry message further comprises a time-date stamp.

3. The method of claim 2, wherein the message further comprises a geolocational indication.

4. The method of claim 3, wherein the geolocational indication includes a GPS datum.

5. The method of claim 1, wherein the enquiry message further comprises a geolocational indication.

6. The method of claim 1, further comprising the enquiry message including a digitized photographic image.

7. The method of claim 1, further comprising the enquiry message including at least two digitized photographic images.

8. The method of claim 1, wherein the tag comprises a bar code and the bar code presents the product identifier code.

9. The method of claim 1, wherein the tag comprises an RFID device and the RFID is adapted to transmit the product identifier code.

* * * * *